United States Patent
Hirata (10) Patent No.: US 7,794,887 B2
(45) Date of Patent: Sep. 14, 2010

(54) FUEL CELL POWER GENERATING SYSTEM, METHOD FOR CONTROLLING FUEL CELL POWER GENERATION, AND FUEL CELL POWER GENERATING APPARATUS

(75) Inventor: Kuninori Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1288 days.

(21) Appl. No.: 10/563,632

(22) PCT Filed: Jul. 2, 2004

(86) PCT No.: PCT/JP2004/009777

§ 371 (c)(1),
(2), (4) Date: Jan. 6, 2006

(87) PCT Pub. No.: WO2005/004271

PCT Pub. Date: Jan. 13, 2005

(65) Prior Publication Data

US 2007/0111045 A1     May 17, 2007

(30) Foreign Application Priority Data

Jul. 7, 2003    (JP)   ............................ 2003-271564

(51) Int. Cl.
     H01M 8/02     (2006.01)
     H01M 8/00     (2006.01)
(52) U.S. Cl. ........................ 429/428; 429/400
(58) Field of Classification Search ................... 429/13; 700/286
See application file for complete search history.

(56) References Cited

U.S. PATENT DOCUMENTS 6,519,539 B1 *   2/2003   Freeman et al. ................ 702/65
2003/0211797 A1 *   11/2003   Hill et al. ..................... 442/205
2004/0023083 A1 *   2/2004   Yang et al. ..................... 429/13

FOREIGN PATENT DOCUMENTS

| JP | 63-98712 | 4/1988 |
| JP | 02-214910 | 8/1990 |
| JP | 03-80316 | 4/1991 |
| JP | 2003-115313 | 4/2003 |
| JP | 2004-265778 | 9/2004 |

* cited by examiner

Primary Examiner—Dah-Wei D Yuan
Assistant Examiner—Maria J Laios
(74) Attorney, Agent, or Firm—Sonnenschein Nath & Rosenthal LLP (57) ABSTRACT

A fuel cell power generating system which is advantageous not only in that steady power supply can be achieved according to the load, but also in that the power supply can be flexibly controlled even when different types of loading apparatus utilize the electric power generated. The fuel cell power generating system includes a fuel cell power generating apparatus (10) for electrochemically reacting a predetermined fuel, such as hydrogen or methanol, and air to allow a power generator to generate electric power, and a loading apparatus (20) connected to the fuel cell power generating apparatus (10) through a predetermined electric cable (30) for supplying the electric power generated by the fuel cell power generating apparatus. The fuel cell power generating apparatus (10) receives loading apparatus power information on electric power required for the loading apparatus (20) through the electric cable (30) upon supplying the electric power to the loading apparatus (20) through the electric cable (30), and controls power generation according to the loading apparatus power information received.

16 Claims, 6 Drawing Sheets

FUEL CELL POWER GENERATING SYSTEM, METHOD FOR CONTROLLING FUEL CELL POWER GENERATION, AND FUEL CELL POWER GENERATING APPARATUS

TECHNICAL FIELD

The present invention relates to a fuel cell power generating system having a fuel cell power generating apparatus for electrochemically reacting a predetermined fuel, such as hydrogen or methanol, and air to allow a power generator to generate electric power, and a loading apparatus which utilizes the electric power generated by the fuel cell power generating apparatus to operate, a method for controlling fuel cell power generation by the fuel cell power generating system, and a fuel cell power generating apparatus for electrochemically reacting a predetermined fuel, such as hydrogen or methanol, and air to allow a power generator to generate electric power.

BACKGROUND ART

Recently, fuel cells are known in which fuel gas or fuel fluid containing a large amount of hydrogen or the like and oxygen (air) as oxidizing gas are fed and electrochemically reacted to generate electric power. Examples include a fuel cell having a structure such that a proton conductor membrane as an electrolyte membrane is sandwiched between a fuel electrode and an air electrode.

Fuel cells can be mounted as power sources on vehicles, such as automobiles, and they are expected to be applied to electric cars or hybrid cars. In addition, the fuel cells have a structure which can be easily reduced in weight or size, and hence an attempt is made to apply the fuel cells to power sources for various information processing apparatuses, such as notebook personal computers, portable phones, and personal digital assistants (PDA). Further, electric power generated by household or personal fuel cells is supplied to electric appliances, such as so-called information appliances.

By the way, the above-mentioned fuel cell generates desired electric power by feeding hydrogen or methanol used as a fuel and oxygen in a satisfactory amount. Therefore, in the fuel cell, for steadily supplying electric power to a loading apparatus which utilizes the electric power generated, it is necessary to steadily feed the fuel to the fuel cell depending on the load. Especially in a so-called direct methanol fuel cell, it is desired to optimize the feed rate of the fuel.

The power generating system using a conventional fuel cell, however, has no means for obtaining the load information about a loading apparatus, e.g., a portable compact disc player or a portable phone.

There are power generating systems using a fuel cell and having a construction such that a plurality of loading apparatus are connected to the system and the individual loading apparatus need different voltages and electric currents. In the systems of this type, it is necessary to determine the optimum electric power to be generated depending on the load conditions and to finely control the feed rate of the fuel.

Further, there are power generating systems using a fuel cell and having connected thereto a loading apparatus that changes the state of power consumption, for example, a loading apparatus that requires predetermined electric power in a normal state and needs only a small amount of electric power in, e.g., a sleep mode. In such a case, in the systems of this type, ideally, an output voltage or the like can be arbitrarily controlled, but there are no means for obtaining the information from the loading apparatus and hence such control cannot be achieved.

In view of the above problems, the present invention has been achieved, and a task is to provide a fuel cell power generating system, a method for controlling fuel cell power generation, and a fuel cell power generating apparatus, which are advantageous not only in that steady power supply can be achieved according to the load, but also in that the power supply can be flexibly controlled even when different types of loading apparatus utilize the electric power generated.

DISCLOSURE OF THE INVENTION

For achieving the above task, the fuel cell power generating system of the present invention is characterized by including:

a fuel cell power generating apparatus for electrochemically reacting a predetermined fuel and air to allow a power generator to generate electric power; and a loading apparatus connected to the fuel cell power generating apparatus through a predetermined electric cable for supplying the electric power generated by the fuel cell power generating apparatus, the loading apparatus utilizing the electric power to operate, wherein the fuel cell power generating apparatus receives loading apparatus power information on electric power required for the loading apparatus through the electric cable upon supplying the electric power to the loading apparatus through the electric cable, and controls power generation according to the loading apparatus power information received.

For achieving the above task, the method for controlling fuel cell power generation of the present invention is a method for controlling power generation by a fuel cell power generating apparatus for electrochemically reacting a predetermined fuel and air to allow a power generator to generate electric power, the method being characterized by including:

a step of generating electric power by the fuel cell power generating apparatus;

a step of receiving loading apparatus power information on electric power required for a loading apparatus through a predetermined electric cable for supplying the electric power generated by the fuel cell power generating apparatus upon supplying the electric power to the loading apparatus through the electric cable, wherein the loading apparatus is connected to the fuel cell power generating apparatus through the electric cable and utilizes the electric power to operate; and a step of controlling power generation by the fuel cell power generating apparatus according to the loading apparatus power information received.

Further, for achieving the above task, the fuel cell power generating apparatus of the present invention is a fuel cell power generating apparatus for electrochemically reacting a predetermined fuel and air to allow a power generator to generate electric power, the apparatus being characterized by including:

a power generator for generating electric power using the fuel fed; and a control means for receiving loading apparatus power information on electric power required for a loading apparatus through a predetermined electric cable for supplying the electric power generated by the power generator upon supplying the electric power to the loading apparatus through the electric cable, wherein the loading apparatus is connected through the electric cable and utilizes the electric power to operate, and for controlling power generation according to the loading apparatus power information received.

In each of the fuel cell power generating system, the method for controlling fuel cell power generation, and the fuel cell power generating apparatus of the present invention, the fuel cell power generating apparatus receives loading apparatus power information on electric power required for the loading apparatus through the electric cable from the loading apparatus upon supplying the electric power through the electric cable, and controls power generation according to the loading apparatus power information, and thus the fuel cell power generating apparatus can grasp changes of the conditions of the loading apparatus.

In each of the fuel cell power generating system, the method for controlling fuel cell power generation, and the fuel cell power generating apparatus of the present invention, the fuel cell power generating apparatus can grasp changes of the conditions of the loading apparatus, and hence the power generation is optimized according to the conditions of the loading apparatus that not only can steady power supply be achieved, but also the power supply can be flexibly controlled even when different types of loading apparatus utilize the electric power generated.

Further, in each of the fuel cell power generating system, the method for controlling fuel cell power generation, and the fuel cell power generating apparatus of the present invention, the loading apparatus power information is received through the electric cable, and therefore a cable for communication is not needed, thus making the handling easy.

BEST MODE FOR CARRYING OUT THE INVENTION

Hereinbelow, a specific embodiment of the present invention will be described with reference to the accompanying drawings.

Figure 1:
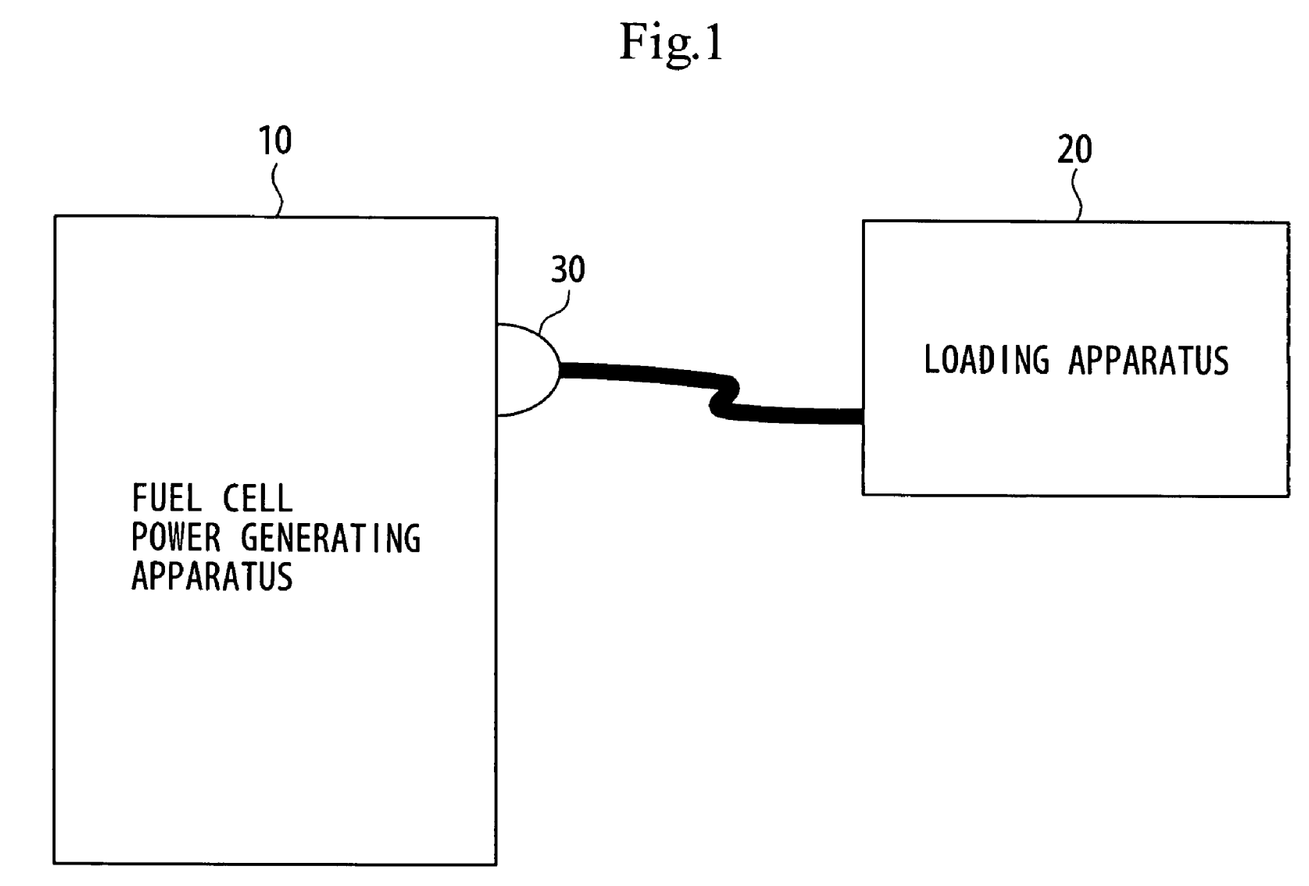
FIG. 1 is a block diagram showing the construction of a fuel cell power generating system according to an embodiment of the present invention.

The present embodiment provides a fuel cell power generating system shown in FIG. 1, which includes a fuel cell power generating apparatus 10 for feeding a predetermined fuel, such as hydrogen or methanol, as fuel gas and air as oxidizing gas and electrochemically reacting the fuel and air to allow a power generator to generate electric power, and a loading apparatus 20 utilizing the electric power generated by the fuel cell power generating apparatus 10 to operate, e.g., a personal computer wherein the loading apparatus is connected to the fuel cell power generating apparatus through a predetermined electric cable 30 having substantially the same form as that of a plug in so-called plug and socket. In the fuel cell power generating system, the fuel cell power generating apparatus 10 receives loading apparatus power information on electric power required for the loading apparatus 20 through the electric cable 30 upon supplying the electric power to the loading apparatus 20 through the electric cable 30, thus making it possible to optimize the power generation.

Figure 2:
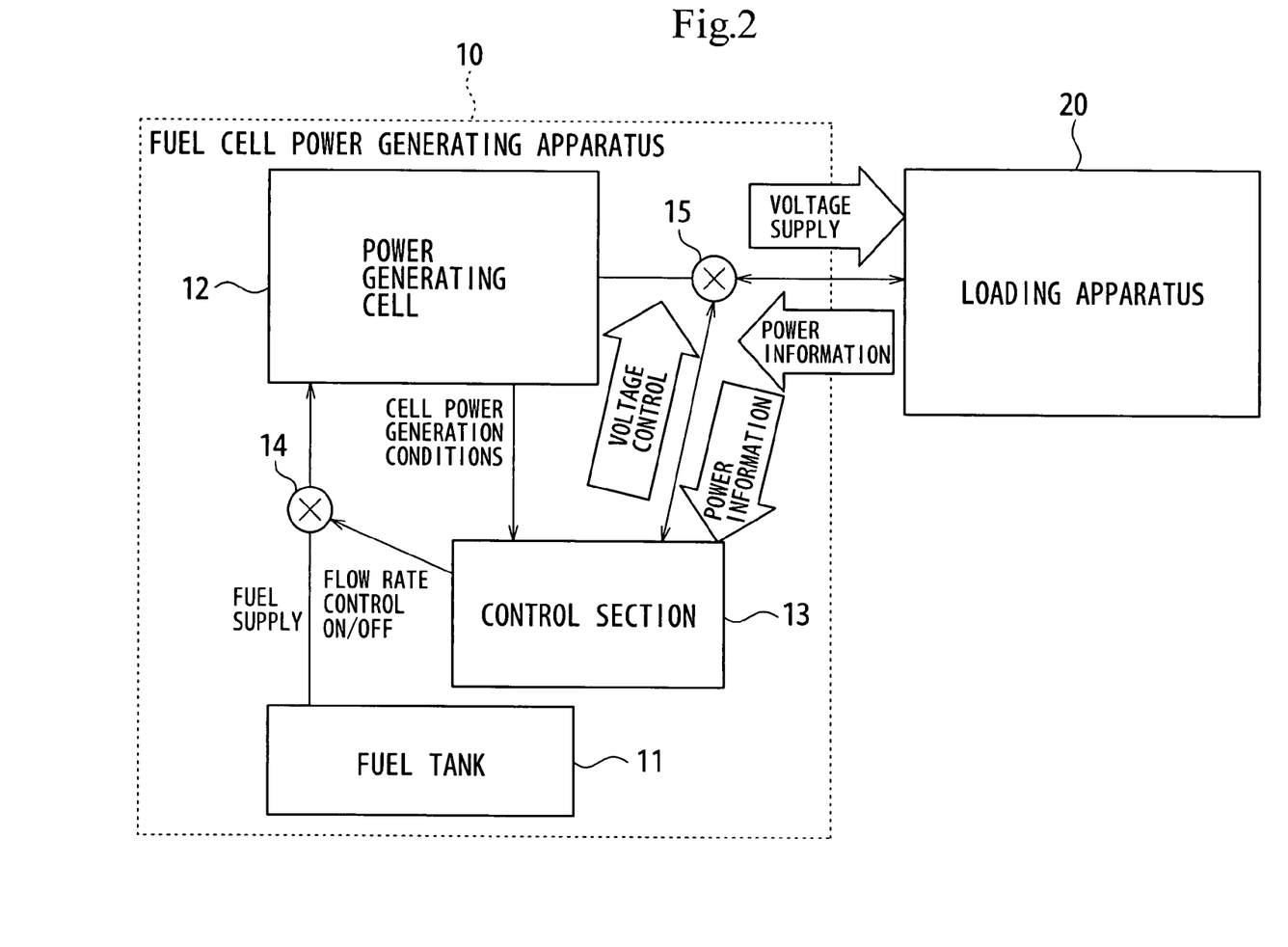
FIG. 2 is a block diagram showing the construction of a fuel cell power generating apparatus in the fuel cell power generating system.

The fuel cell power generating apparatus 10 includes, as shown in FIG. 2, a fuel tank 11 as a fuel storage means for storing therein a fuel to be fed to the below-described power generating cell 12, the power generating cell 12 as a power generator for generating electric power using the fuel fed from the fuel tank 11, a control section 13 as a control means for generally controlling the fuel cell power generating apparatus 10, a flow rate controlling section 14 as a flow rate control means for controlling the flow rate of the fuel fed from the fuel tank 11, and a power controlling section 15 as an electric power control means for controlling the electric power generated by the power generating cell 12.

The fuel tank 11 has a structure such that it can be incorporated into or attached to the fuel cell power generating apparatus 10, and stores a fuel, such as methanol. The fuel tank 11 may have any form as long as it can be used while maintaining a resistance to the pressure of the fuel or a chemical resistance. The fuel tank 11 has a housing formed from, e.g., a plastic, and the housing can be formed from a metal, glass, a synthetic resin, a composite material, or the like. Anyway, the fuel tank 11 is formed selecting a material having a resistance to the fuel to be stored in the tank. The fuel stored in the fuel tank 11 is fed to the power generating cell 12 through a predetermined flow channel while the flow rate of the fuel is controlled by the flow rate controlling section 14.

The power generating cell 12 has, for example, a structure such that a proton conductor membrane as an electrolyte membrane is sandwiched between a fuel electrode and an air electrode, and the power generating cell is incorporated as a fuel cell that uses the fuel fed from the fuel tank 11 to generate electric power. The electric power generated by the power generating cell 12 is supplied to the loading apparatus 20 through the electric cable 30 while the voltage is controlled by the power controlling section 15. The power generating cell 12 sends a power generation conditions signal indicating the power generation conditions to the control section 13.

The control section 13 is a circuit section for generally controlling the fuel cell power generating apparatus 10. The control section 13 sends a flow rate control signal to the flow rate controlling section 14 to control the flow rate of the fuel fed to the power generating cell 12. In addition, the control section 13 sends a voltage control signal to the power controlling section 15 to control the voltage of the electric power supplied to the loading apparatus 20. In this instance, as described below in detail, the control section 13 controls the flow rate controlling section 14 and/or power controlling section 15 according to the loading apparatus power information received from the loading apparatus 20. Further, although not shown, the control section 13 monitors the amount of the residual fuel stored in the fuel tank 11.

The flow rate controlling section 14 is provided at a predetermined flow channel connecting the fuel tank 11 and the power generating cell 12, and includes, e.g., a switch which is turned ON or OFF by the control section 13. The flow rate controlling section 14 opens or closes the flow channel connecting the fuel tank 11 and the power generating cell 12 according to the flow rate control signal sent from the control section 13 to control the flow rate of the fuel fed from the fuel tank 11.

The power controlling section 15 is provided on the downstream side of the power generating cell 12, and includes, e.g., a switch which is turned ON or OFF by the control section 13. The power controlling section 15 commutates and stabilizes the electric power generated by the power generating cell 12 according to the voltage control signal sent from the control section 13 to control the voltage, thus controlling the power supply.

In the fuel cell power generating system including the fuel cell power generating apparatus 10 and the loading apparatus 20, the fuel cell power generating apparatus 10 is connected to the loading apparatus 20 through the electric cable 30, so that communication between the control section 13 in the fuel cell power generating apparatus 10 and the loading apparatus 20 can be achieved. In the fuel cell power generating system, the fuel cell power generating apparatus 10 and the loading apparatus 20 are connected through the electric cable 30, and the loading apparatus power information on electric power required for the loading apparatus 20 is sent to the control section 13 through the electric cable 30. In the fuel cell power generating system, the control section 13 in the fuel cell power generating apparatus 10 controls the flow rate controlling section 14 and/or power controlling section 15 according to the loading apparatus power information received, thus improving and optimizing the power generation efficiency of the power generating cell 12. Particularly, in the fuel cell power generating system, in the control of the electric power, the power is supplied according to the electric power required for the loading apparatus 20, and, in the control of the flow rate of the fuel, the electric power generated is controlled.

Communication between the fuel cell power generating apparatus 10 and the loading apparatus 20 is made by superimposing a pulse of the loading apparatus power information required for the loading apparatus 20 on a voltage signal of, for example, an alternating current (AC) at 100 V flowing through the electric cable 30. In the fuel cell power generating system, the loading apparatus power information is sent with predetermined standard or frequency, for example, when the electric current required for the loading apparatus 20 is reduced by 10%, and electric power is supplied from the fuel cell power generating apparatus 10 only in a required amount according to the conditions of power consumption of the loading apparatus 20, thus optimizing the fuel consumption and operation conditions of the fuel cell power generating apparatus 10.

Figure 3:
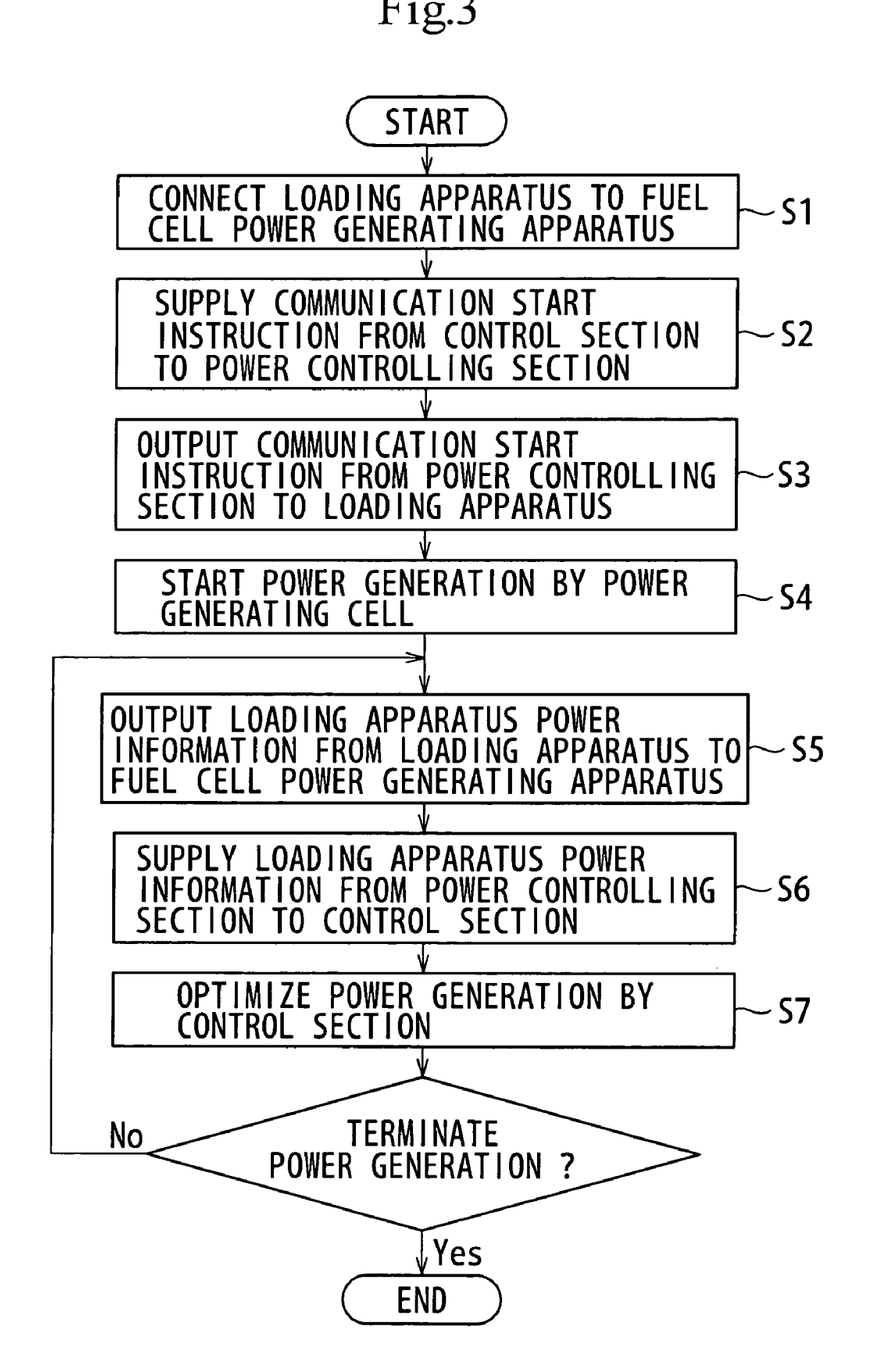
FIG. 3 is a flowchart for explaining the sequence of steps in the power supply to a loading apparatus from the fuel cell power generating apparatus in the fuel cell power generating system.

Specifically, in the fuel cell power generating system, electric power is supplied from the fuel cell power generating apparatus 10 to the loading apparatus 20 through the sequence of steps shown in FIG. 3.

First, in the fuel cell power generating system, as shown in FIG. 3, in the step S1, the loading apparatus 20 is connected to the fuel cell power generating apparatus 10 through the electric cable 30 which is connected to a predetermined power source connector formed in the loading apparatus 20, and which can send a voltage signal of an AC at 100 V, and, at this point in time, in the step S2, communication start instruction information for starting the communication with the loading apparatus 20 is sent from the control section 13 to the power controlling section 15 in the fuel cell power generating apparatus 10.

Then, in the fuel cell power generating system, in the step S3, the communication start instruction information is superimposed on the electric cable 30 by the power controlling section 15 to send the communication start instruction information to the loading apparatus 20.

Then, in the fuel cell power generating system, in the step S4, a fuel is fed from the fuel tank 11 to the power generating cell 12 to start power generation by the power generating cell 12.

Subsequently, in the fuel cell power generating system, in the step S5, the loading apparatus 20, which has received the communication start instruction information, superimposes loading apparatus power information on the required electric power on the electric cable 30 in accordance with the predetermined procedure to send the loading apparatus power information to the fuel cell power generating apparatus 10.

Then, in the fuel cell power generating system, in the step S6, the loading apparatus power information is picked up from the signal sent by the power controlling section 15 through the electric cable 30 to send the loading apparatus power information to the control section 13.

Subsequently, in the fuel cell power generating system, in the step S7, the control section 13 sends a flow rate control signal to the flow rate controlling section 14 and/or sends a voltage control signal to the power controlling section 15 according to the loading apparatus power information received to control the power supply so as to improve and optimize the power generation efficiency.

Then, in the fuel cell power generating system, the step S8 judges whether the power generation is terminated or not. When the power generation is terminated, the sequence of steps is ended in this step. On the other hand, when the power generation is not terminated, the sequence of steps from the step S5 is repeated, and the control of the power generation according to the loading apparatus power information sent from the loading apparatus 20 is continued with predetermined standard or frequency.

In the fuel cell power generating system, communication between the fuel cell power generating apparatus 10 and the loading apparatus 20 through the sequence of the steps enables electric power to be supplied to the loading apparatus 20 from the fuel cell power generating apparatus 10.

Thus, in the fuel cell power generating system, the fuel cell power generating apparatus 10 receives loading apparatus power information on electric power required for the loading apparatus 20 through the electric cable 30 upon supplying the electric power to the loading apparatus 20 through the electric cable 30, and the fuel cell power generating apparatus 10 can grasp changes of the conditions of the loading apparatus 20, thus optimizing the power generation.

There is a loading apparatus 20 that cannot be directly connected to the fuel cell power generating apparatus 10 to send or receive information. An example in which such an unsuitable loading apparatus 20 is connected to the apparatus is described below.

Figure 4:
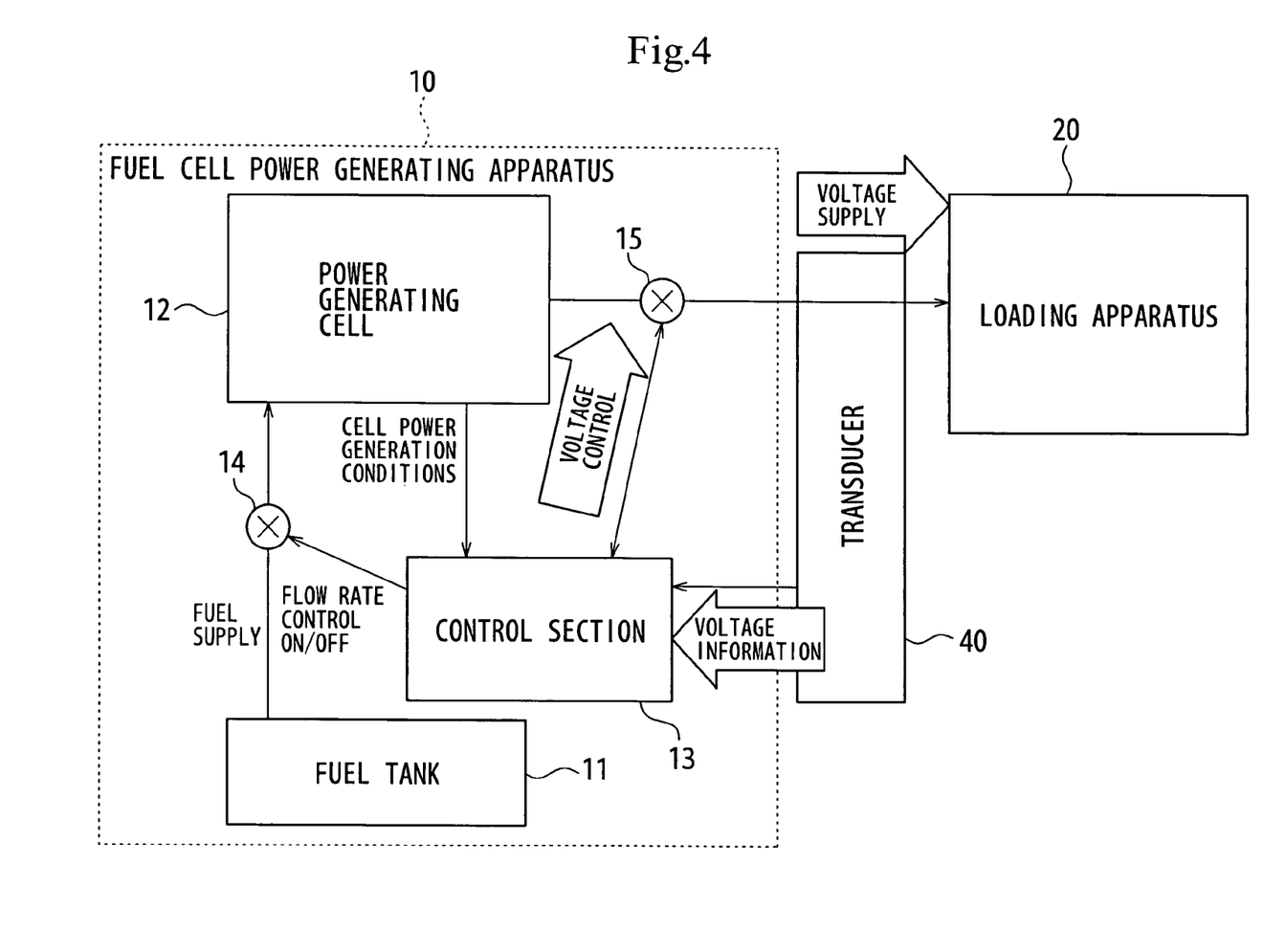
FIG. 4 is a block diagram showing the construction of a fuel cell power generating apparatus in the fuel cell power generating system, for explaining an example in which a loading apparatus that cannot be directly connected to the fuel cell power generating apparatus to send or receive information is connected to the apparatus.

In this case, in the fuel cell power generating system, as shown in FIG. 4, a predetermined transducer 40 as a transduction means is attached to the fuel cell power generating apparatus 10, and an electric cable 30 is connected to the transducer 40 to connect the fuel cell power generating apparatus 10 and the loading apparatus 20.

Figure 5A:
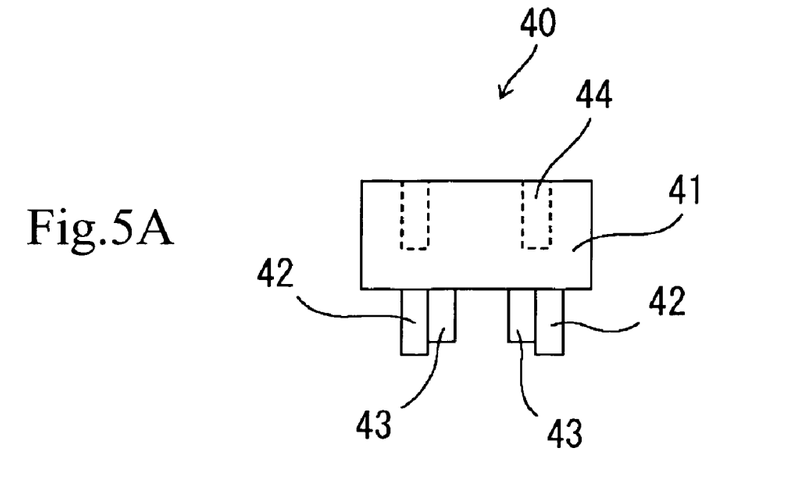
FIG. 5A is a top view showing the construction of a transducer in the fuel cell power generating system.
Figure 5B:
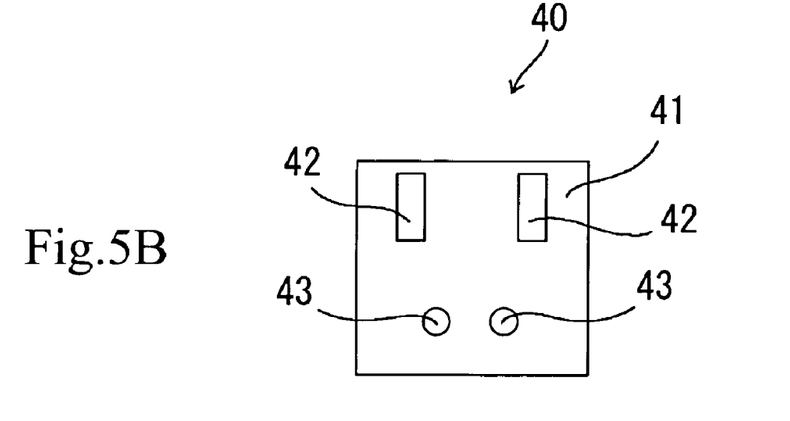
FIG. 5B is a front view showing the construction of the transducer in the fuel cell power generating system.
Figure 5C:
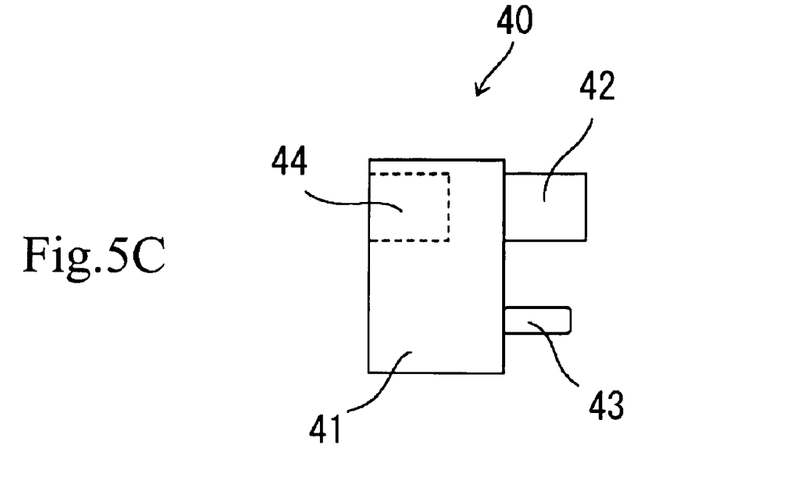
FIG. 5C is a side view showing the construction of the transducer in the fuel cell power generating system.

As shown in a top view of FIG. 5A as viewed from the top, a front view of FIG. 5B as viewed from the front, and a side view of FIG. 5C as viewed from the left side, the transducer 40 includes a pair of plug portions 42 for power reception for receiving the electric power generated by the fuel cell power generating apparatus 10 wherein the plug portions include two pieces formed from a predetermined conductive material, a pair of connector portions 43 for power information communication for sending the loading apparatus power information to the fuel cell power generating apparatus 10 wherein the connector portions include two pieces formed from a predetermined conductive material, and a rectangular parallelepiped housing 41 having a front plane from which the plug portions for power reception and the connector portions for power information communication protrude. In the transducer 40, a pair of socket portions 44 for loading apparatus are formed in the back plane of the housing 41 wherein the socket portions include two holes and a plug formed at the end of the electric cable 30 extending from the loading apparatus 20 is inserted into the socket portions.

Figure 6A:
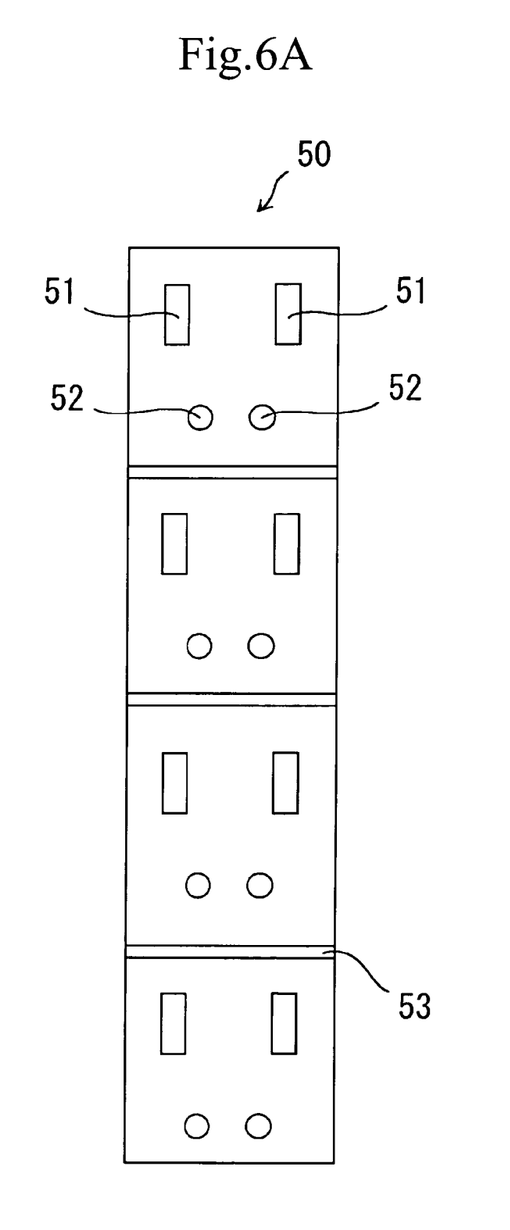
FIG. 6A is a front view showing the construction of a power output section in the fuel cell power generating apparatus.
Figure 6B:
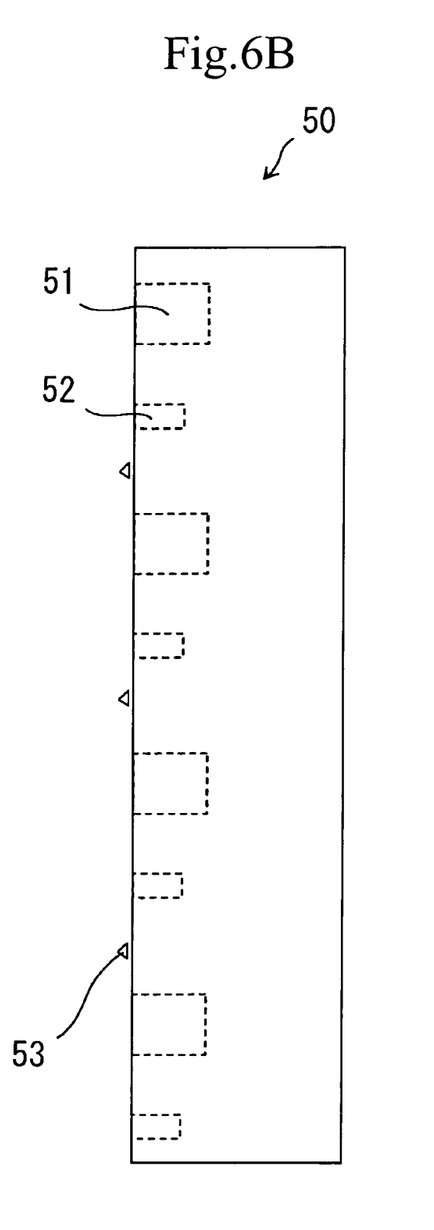
FIG. 6B is a side view showing the construction of the power output section in the fuel cell power generating apparatus.

On the other hand, as shown in a front view of FIG. 6A and a side view of FIG. 6B as viewed from the right side, the fuel cell power generating apparatus 10 has a power output section 50 as an electric power output means for connecting the loading apparatus 20. The power output section 50 includes a pair of socket portions 51 for power supply, which include two holes corresponding to the plug portions 42 for power reception in the transducer 40, and a pair of socket portions 52 for power information communication, which include two holes corresponding to the connector portions 43 for power information communication in the transducer 40.

The power output section 50 is not only used for connection of the loading apparatus 20 unsuitable for direct connection but also used for connection of the loading apparatus 20 that can be directly connected to the fuel cell power generating apparatus 10 to send or receive information as previously shown in FIG. 2, and, in the latter case, a plug formed at the end of the electric cable 30 is inserted into the socket portions 51 for power supply.

The power output section 50 has a wrong insertion prevention portion 53 having a small protrusion for preventing an accidental error in insertion or fitting of the plug portions 42 for power reception and the connector portions 43 for power information communication in the transducer 40 and the plug of the electric cable 30.

For enabling connection of a plurality of loading apparatus, a plurality of, for example, four power output sections 50 are provided. That is, in the fuel cell power generating system, a plurality of loading apparatus requiring different electric power can be connected.

In the fuel cell power generating system, the transducer 40 having the plug, formed at the end of the electric cable 30 extending from the loading apparatus 20, inserted into the socket portions 44 for loading apparatus is fitted to the fuel cell power generating apparatus 10. Specifically, in the fuel cell power generating system, the plug portions 42 for power reception in the transducer 40 are inserted into the socket portions 51 for power supply and the connector portions 43 for power information communication in the transducer 40 are inserted into the socket portions 52 for power information communication to achieve connection between the fuel cell power generating apparatus 10 and the loading apparatus 20.

In the fuel cell power generating system, for example, when the loading apparatus 20 requires electric power of 30 W at a voltage of 12 V, the loading apparatus exhibits a resistance of 4 k$\Omega$, and a table of the correlation between the power consumption and the resistance of the loading apparatus 20 is preliminarily prepared, and the table is stored inside the control section 13 in the fuel cell power generating apparatus 10 or stored in a not shown external memory area. The transducer 40 has incorporated a resistance element exhibiting a resistance corresponding to the power consumption of the loading apparatus 20, and the connector portions 43 for power information communication are directly connected to the resistance element.

In the fuel cell power generating system, the loading apparatus 20 is connected to the fuel cell power generating apparatus 10 through the electric cable 30 and transducer 40, and thus communication start instruction information for starting communication with the loading apparatus 20 is sent from the control section 13 to the power controlling section 15 in the fuel cell power generating apparatus 10, but communication between the control section 13 and the loading apparatus 20 through the power controlling section 15 is not established. Therefore, in the fuel cell power generating system, loading apparatus power information is sent between the fuel cell power generating apparatus 10 and the loading apparatus 20 as described below.

Specifically, in the fuel cell power generating system, when it is recognized that communication between the control section 13 and the loading apparatus 20 through the power controlling section 15 is not made, the control section 13 flows a fine electric current to the connector portions 43 for power information communication in the transducer 40, and detects the resistance as loading apparatus power information.

Then, in the fuel cell power generating system, the control section 13 examines the resistance detected with reference to the above-mentioned table to simply know the electric power required for the loading apparatus 20, and sends a flow rate control signal to the flow rate controlling section 14 and/or sends a voltage control signal to the power controlling section 15 to control the power supply so as to optimize the power generation.

Thus, in the fuel cell power generating system, even when the loading apparatus 20 is unsuitable for direct connection, a resistance is detected using the transducer 40 to make it possible to receive the loading apparatus power information on electric power required for the loading apparatus 20, thus optimizing the power generation.

As described above in detail, in the fuel cell power generating system according to the embodiment of the present invention, the fuel cell power generating apparatus 10 receives loading apparatus power information on electric power required for the loading apparatus 20 through the electric cable 30 upon supplying the electric power to the loading apparatus 20 through the electric cable 30, and thus the fuel cell power generating apparatus 10 can grasp changes of the conditions of the loading apparatus 20, and the power generation is optimized according to the conditions of the loading apparatus that not only can steady power supply be achieved, but also the power supply can be flexibly controlled even when different types of loading apparatus 20 utilize the electric power generated.

In the fuel cell power generating system, the loading apparatus power information is received through the electric cable 30, and therefore a cable for communication is not needed, thus making the handling easy.

Further, in the fuel cell power generating system, receiving the loading apparatus power information makes it possible to detect an overload caused when a plurality of loading apparatus 20 are connected to the fuel cell power generating apparatus 10, thus avoiding an accident, such as power generation stop due to the overload.

Furthermore, in the fuel cell power generating system, even the loading apparatus 20 unsuitable for direct connection can be connected through the transducer 40, thus making it possible to optimize the power generation.

In the fuel cell power generating system, for supplying electric power to the loading apparatus 20, the power output section 50 in the fuel cell power generating apparatus 10 has a pair of socket portions 51 for power supply having two holes, and the transducer 40 has a pair of socket portions 44 for loading apparatus having two holes, and therefore the loading apparatus 20 can be connected to the fuel cell power generating apparatus 10 through a general power source plug having a pair of two pieces of plugs.

The present invention is not limited to the above-mentioned embodiment. For example, in the above embodiment, it is not shown how to deal with the matter when an overload is detected, but, in the present invention, when a plurality of loading apparatus 20 are connected so that the load exceeds the capacity of the fuel cell power generating apparatus 10, warning information may be displayed through a predetermined display means.

In the above embodiment, an example is shown in which methanol is mainly used as a fuel, but, in the present invention, for example, ethanol or gas of hydrogen or the like may be used as a fuel.

The loading apparatus 20 is not limited to the personal computer, and examples of loading apparatus include laptop personal computers, portable printers and facsimile machines, peripheral appliances for personal computer, telephones including portable phones, television sets, communication machines, personal digital assistants, cameras, audio machines, video machines, electric fans, refrigerators, irons, electric teakettles, sweepers, rice cookers, cookers for electromagnetic heat source, illuminators, toys, such as videogames and radio-controlled cars, electric tools, medical appliances, measurement machines, appliances for cars, office machines, equipment for health and beauty, electronically controlled robots, wearable electronic appliances, equipment for leisure time amusement, and sports equipment, and any electronic device in other applications using a fuel cell as a power source can be used.

The present invention can be changed or modified as long as the effect of the present invention can be obtained.

The invention claimed is:

1. A fuel cell power generating system characterized by comprising:
    a fuel cell power generating apparatus for electrochemically reacting a predetermined fuel and air to allow a power generator to generate electric power; and
    a loading apparatus connected to said fuel cell power generating apparatus through a predetermined electric cable for supplying the electric power generated by said fuel cell power generating apparatus, said loading apparatus utilizing the electric power to operate,
    wherein,
        said fuel cell power generating apparatus receives loading apparatus power information on electric power required for said loading apparatus through the electric cable upon supplying the electric power to said loading apparatus through the electric cable, and controls power generation according to the loading apparatus power information received, and
        in case the loading apparatus cannot be directly connected to the fuel cell power generating apparatus to send or receive information, a predetermined transduction means is attached to the fuel cell power generating apparatus, and the electric cable is connected to the transduction means to connect said fuel cell power generating apparatus and said loading apparatus.

2. The fuel cell power generating system as described in claim 1 characterized in that said transduction means comprises:
    a plug portion for power reception for receiving the electric power generated by said fuel cell power generating apparatus;
    a connector portion for power information communication for sending the loading apparatus power information to said fuel cell power generating apparatus; and
    a socket portion for loading apparatus for inserting the electric cable extending from said loading apparatus.

3. The fuel cell power generating system as described in claim 2 characterized in that:
    said fuel cell power generating apparatus has an electric power output means having a socket portion for power supply corresponding to said plug portion for power reception in said transduction means, and a socket portion for power information communication corresponding to said connector portion for power information communication in said transduction means.

4. The fuel cell power generating system as described in claim 3 characterized in that:
    said electric power output means has a wrong insertion prevention means for preventing an error in insertion or fitting for said plug portion for power reception and said connector portion for power information communication in said transduction means.

5. The fuel cell power generating system as described in claim 3 characterized in that:
    said fuel cell power generating apparatus has a plurality of electric power output means.

6. The fuel cell power generating system as described in claim 3 characterized in that:
    said transduction means has incorporated a resistance element exhibiting a resistance corresponding to the power consumption of said loading apparatus, and said connector portion for power information communication is directly connected to said resistance element.

7. The fuel cell power generating system as described in claim 6 characterized in that:
    said fuel cell power generating apparatus flows a fine electric current to said connector portion for power information communication in said transduction means, and detects the resistance as loading apparatus power information.

8. The fuel cell power generating system as described in claim 7 characterized in that:
    said fuel cell power generating apparatus recognizes electric power required for said loads device, with said resistance detected being referred to a table of correlation between the power consumption and the resistance of said loading apparatus.

9. A fuel cell power generating apparatus for electrochemically reacting a predetermined fuel and air to allow a power generator to generate electric power, said apparatus characterized by comprising:
    a power generator for generating electric power using the fuel fed; and
    a control means for receiving loading apparatus power information on electric power required for a loading apparatus through a predetermined electric cable for supplying the electric power generated by the power generator upon supplying the electric power to the loading apparatus through the electric cable, wherein,
the loading apparatus is connected through the electric cable and utilizes the electric power to operate, and for controlling power generation according to the loading apparatus power information received, and in case the loading apparatus cannot be directly connected to the fuel cell power generating apparatus to send or receive information, a predetermined transduction means is attached to the fuel cell power generating apparatus, and the electric cable is connected to the transduction means to connect said control means and said loading apparatus.

10. The fuel cell power generating apparatus as described in claim 9 characterized in that said transduction means comprises:

a plug portion for power reception for receiving the electric power generated by said fuel cell power generating apparatus;

a connector portion for power information communication for sending the loading apparatus power information to said fuel cell power generating apparatus; and a socket portion for loading apparatus for inserting the electric cable extending from said loading apparatus.

11. The fuel cell power generating apparatus as described in claim 10 characterized by having an electric power output means having a socket portion for power supply corresponding to said plug portion for power reception in said transduction means, and a socket portion for power information communication corresponding to said connector portion for power information communication in said transduction means.

12. The fuel cell power generating apparatus as described in claim 11 characterized in that:

said electric power output means has a wrong insertion prevention means for preventing an error in insertion or fitting for said plug portion for power reception and said connector portion for power information communication in said transduction means.

13. The fuel cell power generating apparatus as described in claim 11 characterized by having a plurality of electric power output means.

14. The fuel cell power generating apparatus as described in claim 11 characterized in that:

said transduction means has incorporated a resistance element exhibiting a resistance corresponding to the power consumption of said loading apparatus, and said connector portion for power information communication is directly connected to said resistance element.

15. The fuel cell power generating apparatus as described in claim 14 characterized in that:

said control means flows a fine electric current to said connector portion for power information communication in said transduction means, and detects the resistance as loading apparatus power information.

16. The fuel cell power generating apparatus as described in claim 15 characterized in that:

said control means recognizes electric power required for said loads device, with said resistance detected being referred to a table of correlation between the power consumption and the resistance of said loading apparatus.

* * * * *